United States Patent
Kotake et al.

(10) Patent No.: US 6,674,922 B1
(45) Date of Patent: Jan. 6, 2004

(54) IMAGE PROCESSING METHOD, IMAGE PROCESSING APPARATUS, AND STORAGE MEDIUM

(75) Inventors: Daisuke Kotake, Yokohama (JP); Yukio Sakagawa, Tokyo (JP); Akihiro Katayama, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/499,300

(22) Filed: Feb. 7, 2000

(30) Foreign Application Priority Data

Mar. 26, 1999 (JP) .......................................... 11-084662

(51) Int. Cl.$^7$ .............................. G06K 9/32; G09G 5/00
(52) U.S. Cl. ....................... 382/300; 382/299; 345/582; 358/1.2
(58) Field of Search ................................ 382/108, 154, 382/162, 253, 254, 274, 284, 299, 300, 312; 358/1–2, 525; 345/426, 427, 582, 584, 606, 653, 660

(56) References Cited

U.S. PATENT DOCUMENTS

| | | | | |
|---|---|---|---|---|
| 4,865,423 A | * | 9/1989 | Doi .............................. | 345/421 |
| 5,317,689 A | * | 5/1994 | Nack et al. .................. | 345/505 |
| 5,420,788 A | * | 5/1995 | Vissers ........................ | 378/10 |
| 5,933,146 A | * | 8/1999 | Wrigley ...................... | 345/420 |
| 6,097,394 A | * | 8/2000 | Levoy et al. ................ | 345/419 |
| 6,108,105 A | | 8/2000 | Takeuchi et al. ............ | 358/455 |
| 6,256,035 B1 | * | 7/2001 | Katayama et al. .......... | 345/419 |
| 6,313,846 B1 | * | 11/2001 | Fenney et al. .............. | 345/552 |
| 6,400,365 B1 | * | 6/2002 | Setoguchi ................... | 345/427 |
| 6,445,807 B1 | * | 9/2002 | Katayama et al. .......... | 382/100 |

FOREIGN PATENT DOCUMENTS

| | | |
|---|---|---|
| JP | 2-185456 | 7/1990 |
| JP | 9-245192 | 9/1997 |
| JP | 9-245195 | 9/1997 |
| JP | 10-027264 | 1/1998 |
| JP | 10-027268 | 1/1998 |
| JP | 10-97642 | 4/1998 |
| JP | 10-111951 | 4/1998 |
| JP | 10-111953 | 4/1998 |
| JP | 10-255069 | 9/1998 |
| JP | 10-255081 | 9/1998 |

OTHER PUBLICATIONS

Transformation of Hologram and Ray Space for Integrated 3D Visual Communication, T. Fujii, et al., 3D Image Conference '95.

"Implementation of Virtual Environment by Mixing CG Model and Ray Space Data", A. Katayama, et al., IEICE Journal D–11, vol. J80–D–11 No. 11, pp. 3048–3057, Nov. 1997, with English Summary.

\* cited by examiner

*Primary Examiner*—Bhavesh M. Mehta
*Assistant Examiner*—Kanji Patel
(74) *Attorney, Agent, or Firm*—Fitzpatrick, Cella, Harper & Scinto (57) ABSTRACT

An image processing apparatus includes recording unit which has recorded image information appended with quantized space information in units of pixels, setting unit for setting a resolution higher than that of the recorded image information, reconstruction unit for reconstructing an image by reading out image information from the recording unit at the recorded resolution irrespective of the resolution set by the setting unit, and interpolation unit for making pixel interpolation of the reconstructed image with the resolution of the reconstructed image matching the resolution set by the setting unit.

13 Claims, 14 Drawing Sheets

FIG. 1
PRIOR ART

FIG. 2
PRIOR ART
REAL SPACE

IMAGE PROCESSING METHOD, IMAGE PROCESSING APPARATUS, AND STORAGE MEDIUM

FIELD OF THE INVENTION

The present invention relates to an image processing apparatus and method for reconstructing an image, which records image information appended with quantized space information such as image information expressed by, e.g., a ray space theory, in a virtual space and, more particularly, to an improvement in resolution.

BACKGROUND OF THE INVENTION

Attempts to describe a virtual space on the basis of a ray space theory have been proposed. See, for example, "Implementation of Virtual Environment by Mixing CG model and Ray Space Data", IEICE Journal D-11, Vol. J80-D-11 No. 11, pp. 3048–3057, November 1997, or "Mutual Conversion between Hologram and Ray Space Aiming at 3D Integrated Image Communication", 3D Image Conference, and the like.

A recording method of ray space data will be explained below.

Figure 1:
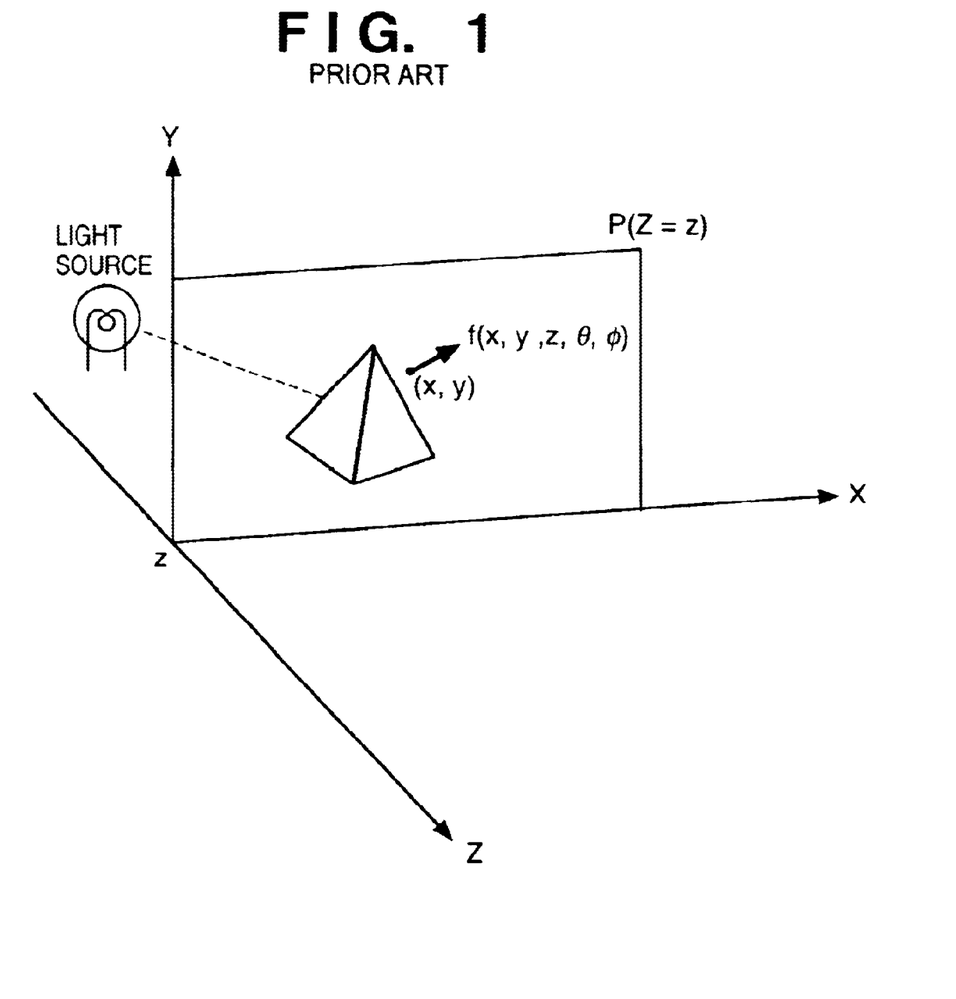
FIG. 1 is a view for explaining the principle for generating ray space data.

As shown in FIG. 1, a coordinate system 0-X-Y-Z is defined in a real space. A light ray, perpendicular to the Z-axis that passes through a reference plane P (Z=z) is defined by a position (x, y) where the light ray crosses P, and variables $\theta$ and $\phi$ that indicate the direction of the light ray. More specifically, a single light ray is uniquely defined by five variables (x, y, z, $\theta$, $\phi$). If a function that represents the light intensity of this light ray is defined as f, light ray group data in this space can be expressed by f(x, y, z, $\theta$, $\phi$). This five-dimensional space is called a "ray space".

Figure 2:
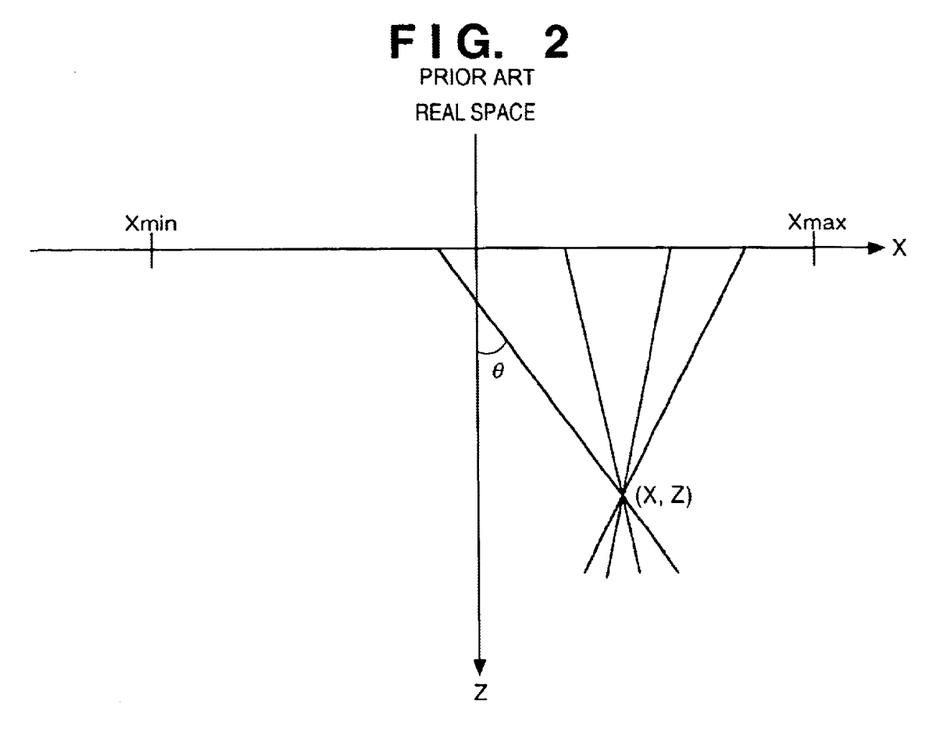
FIG. 2 is a view for explaining data in a real space.
Figure 3:
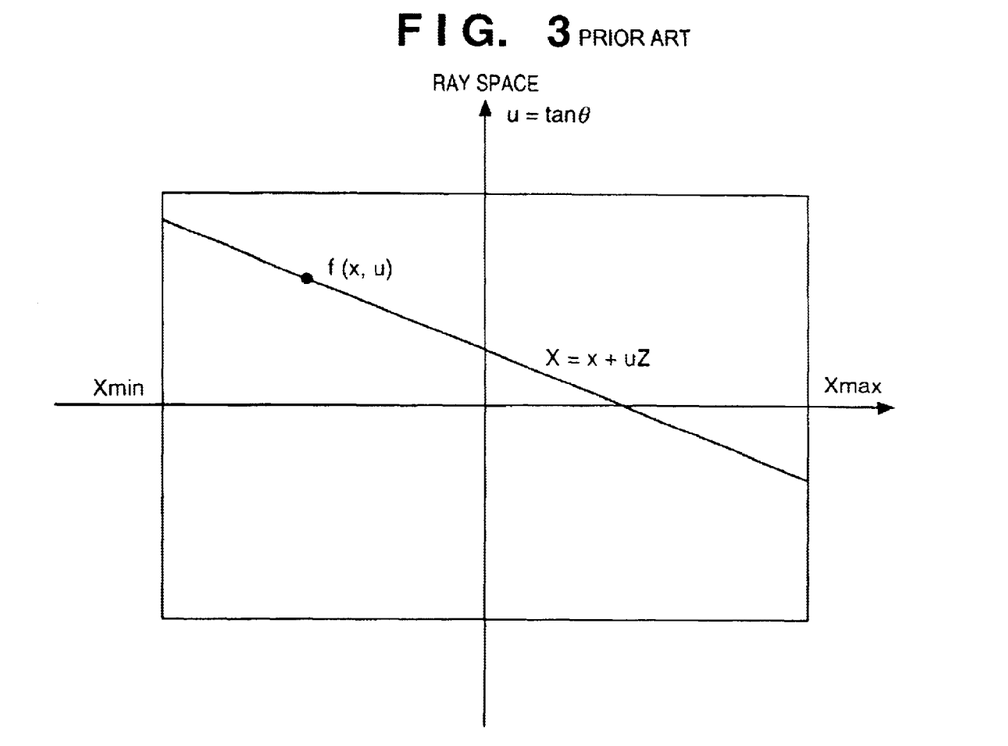
FIG. 3 is a view showing the space shown in FIG. 2, which is expressed by ray space data.

If the reference plane P is set at z=0, and disparity information of a light ray in the vertical direction, i.e., the degree of freedom in the $\phi$ direction is omitted, the degree of freedom of the light ray can be regenerated in two dimensions (x, $\theta$). This x-$\theta$ two-dimensional space is a partial space of the ray space. As shown in FIG. 3, if u=tan$\theta$, a light ray (FIG. 2) which passes through a point (X, Z) in the real space is mapped onto a line in the x-u space, said line is given by:

$$X = x + uZ \quad (1)$$

Image sensing by a camera reduces to receiving light rays that pass through the focal point of the lens of the camera onto an image sensing surface, and converting their brightness levels and colors into image signal. In other words, a light ray group which passes through one point, i.e., the focal point, in the real space is captured as an image represented by a number of pixels. Since the degree of freedom in the $\phi$ direction is omitted, and the behavior of a light ray is examined in only the X-Z plane, only pixels on a line segment that intersects a plane orthogonal with respect to the Y-axis need to be considered. In this manner, by sensing an image, light rays that pass through one point can be collected, and data on a single line segment in the x-u space can be captured by a single image sensing.

Figure 4:
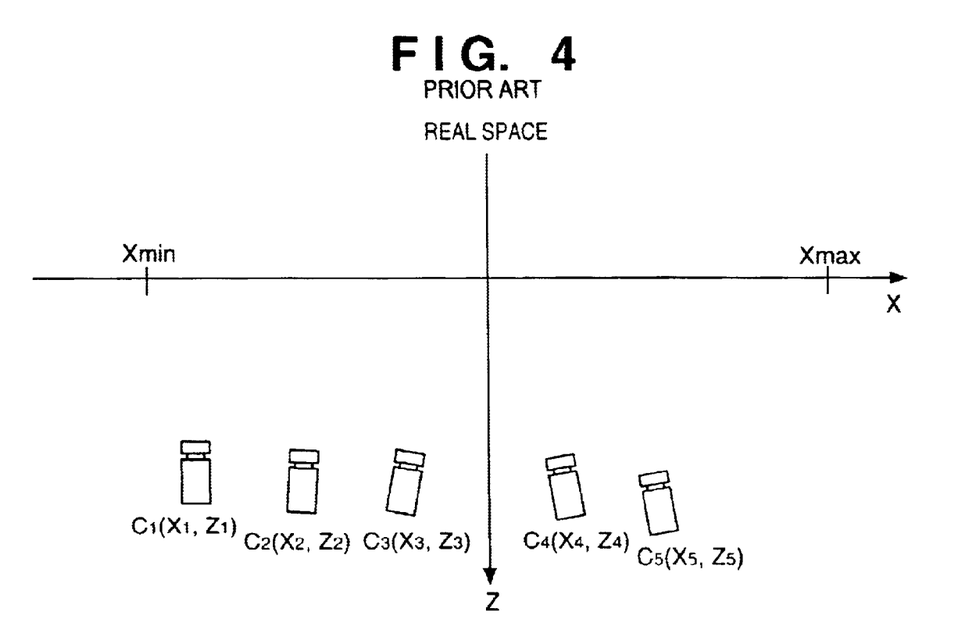
FIG. 4 is a view for explaining the principle of generating real space data when there are a plurality of cameras.
Figure 5:
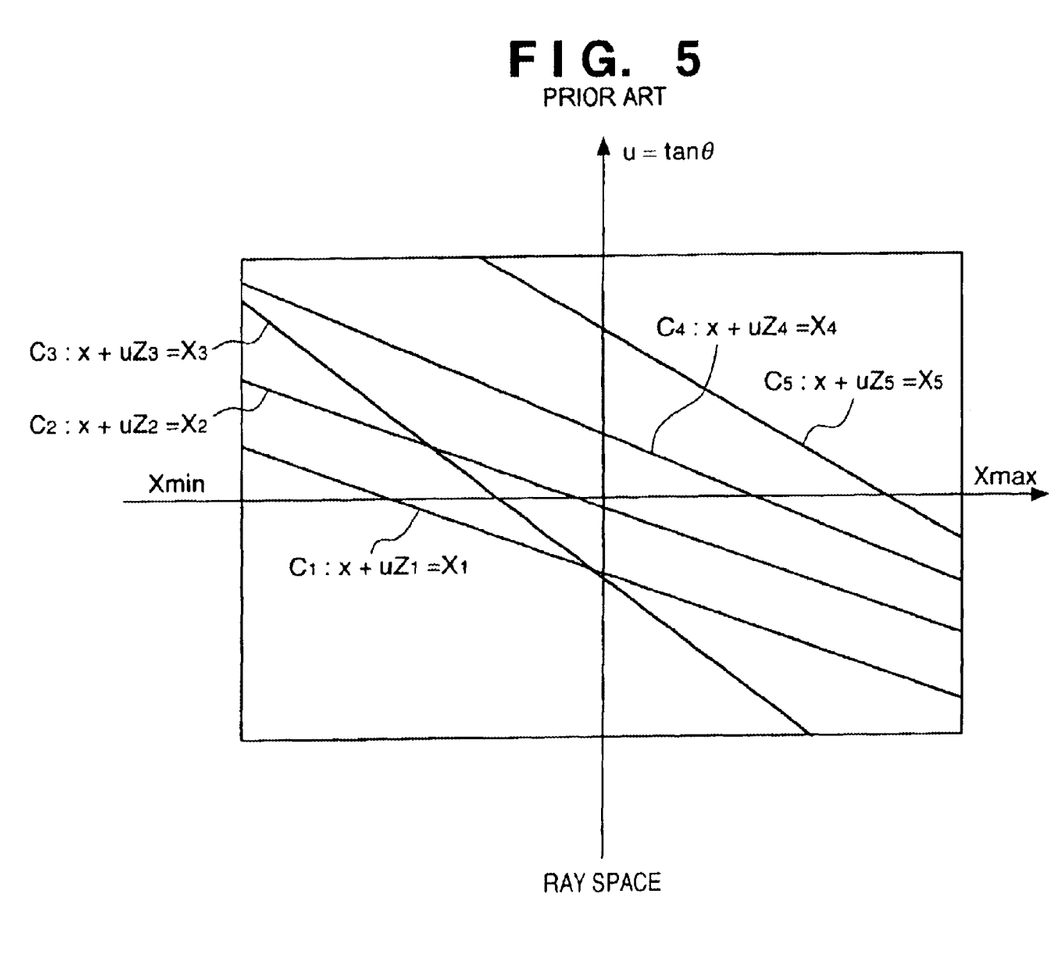
FIG. 5 is a view for explaining the principle of generating ray space data when there are a plurality of cameras.

When this image sensing is done a large number of times by changing the view point position, light ray groups which pass through a large number of points can be captured. When the real space is sensed using N cameras, as shown in FIG. 4, data on a line given by:

$$x + Z_n u = X_n \quad (2)$$

can be input in correspondence with a focal point position $(X_n, Z_n)$ of the n-th camera (n=1, 2, ..., N), as shown in FIG. 5. In this way, when an image is sensed from a sufficiently large number of view points, the x-u space can be densely filled with data.

Figure 6:
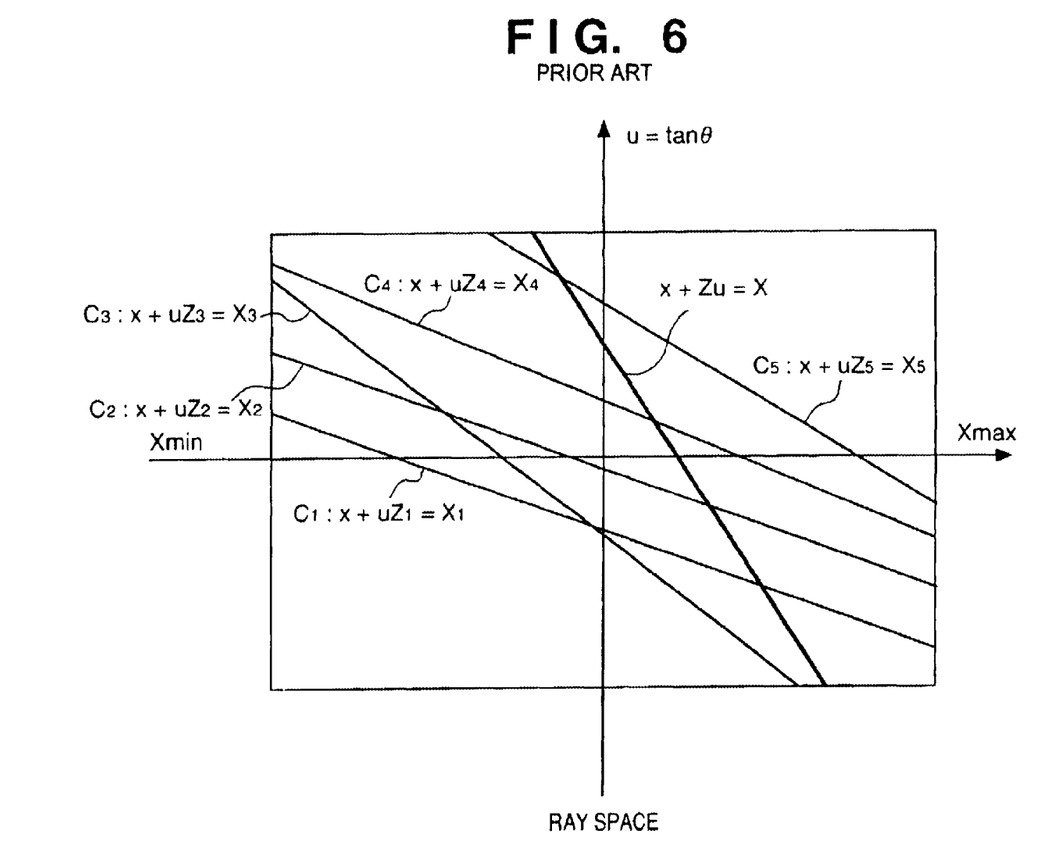
FIG. 6 is a view for explaining the principle of generating ray space data (x+Zu=X) at an arbitrary view point position from ray space data when there are a plurality of cameras.
Figure 7:
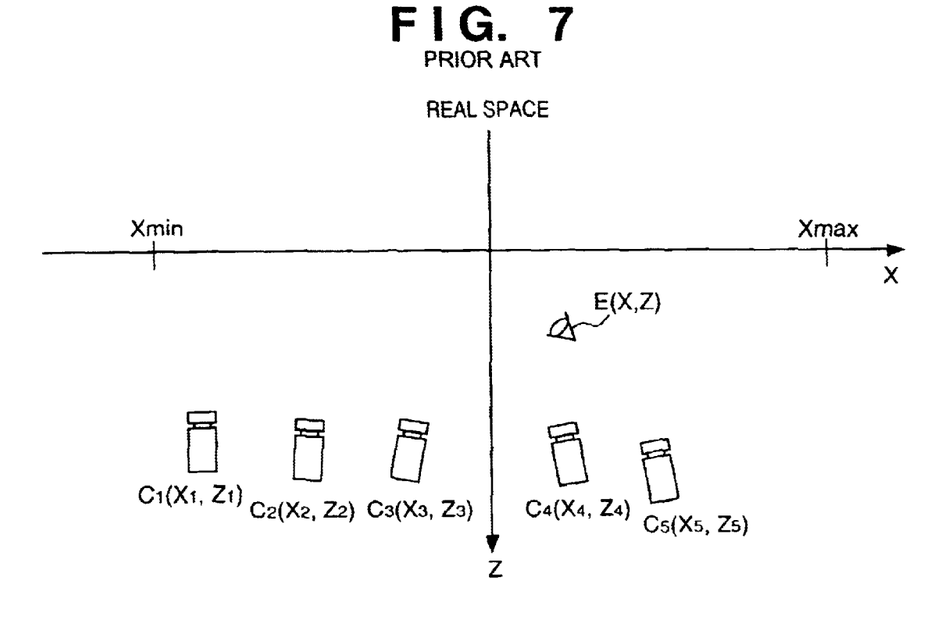
FIG. 7 is a view for explaining the principle of reconstructing a real space from the arbitrary view point in FIG. 6.

Conversely, an observed image from a new arbitrary view point position can be generated (FIG. 7) from the data of the x-u space (FIG. 6). As shown in FIG. 7, an observed image from a new view point position E(X, Z), indicated by an eye mark, can be generated by reading out data on a line given by equation (1) from the x-u space.

One major feature of ray space data is that ray space data is defined for each pixel. That is, frame data for one scene is expressed by only ray space data. Hence, the data size of ray space data does not depend on the complexity of a scene, but depends on only the size and resolution of the scene. For this reason, when a given scene is complicated, normal CG data cannot express that complexity unless the number of polygons is large (an increase in the number of polygons leads to an increase in computation volume). However, ray space data does not require an increase in data size.

In other words, image data such as ray space data in which image information includes space information requires an image process for pixels for one frame to reconstruct an image.

However, when an enlarged image is reconstructed from ray space data or when the field angle is decreased to be smaller than that of the original image sensing angle, since the data size of ray space data remains the same, a plurality of pixels must refer to the same ray space data. This is caused by the enlargement of an image from ray space data witch requires processes for new pixels to be added as a result of enlargement, as described above. However, reference to same ray space data, although necessary is wasteful process.

SUMMARY OF THE INVENTION

The present invention has been proposed to solve conventional problems, and has as its object to provide an image processing apparatus and method, which can reconstruct an enlarged image at high speed without producing any wasteful pixel reference when an enlarged image is reconstructed from image data such as ray space data in which image information includes space data or when the field angle is decreased to be smaller than that upon image sensing.

In order to achieve the above object, an image processing apparatus of the present invention comprises:

recording means which has recorded in units of pixels image information appended with space information that has been quantized at a predetermined first resolution;

setting means for setting a second resolution higher than the first resolution; and sample/interpolation means for sampling the image information of the first resolution and assigning the sampled image information, and interpolating pixels at empty pixel positions which are produced due to a difference between the second and first resolutions, upon reading out image information from the recording means at the second resolution.

Further, a method of the present invention that achieves the above object is an image processing method for reconstructing an image based on image information read out from a recording step which has recorded in units of pixels image information appended with space information that has been quantized at a predetermined first resolution, comprising:

a setting step of setting a second resolution higher than the first resolution; and a sample/interpolation step of sampling the image information at the first resolution and assigning the sampled image information, and interpolating pixels at empty pixel positions which are produced due to a difference between the second and first resolutions, upon reading out image information from the recording means at the second resolution.

As a preferred aspect of the present invention, the image information is expressed by a ray space theory.

As a preferred aspect of the present invention, when ray space data has different resolutions in different coordinate axis directions, recorded ray space data are sampled at a lower resolution.

As a preferred aspect of the present invention, the sample/interpolation means interpolates pixels by texture mapping.

As a preferred aspect of the present invention, the sample/interpolation means pastes texture data by enlarging the texture data by a magnification of the second resolution/first resolution.

The above object can also be achieved by a program for implementing the image processing method stored in a storage medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

An image processing apparatus and method to which the present invention is applied will be described hereinafter with reference to the accompanying drawings. In this image processing apparatus and method, when resolution is increased from ray space data and an enlarged image is reconstructed, original ray space data are read out at the resolution upon recording, an image is reconstructed at the increased resolution, and image data is pasted at empty pixel positions of the enlarged image by texture mapping.

Figure 8:
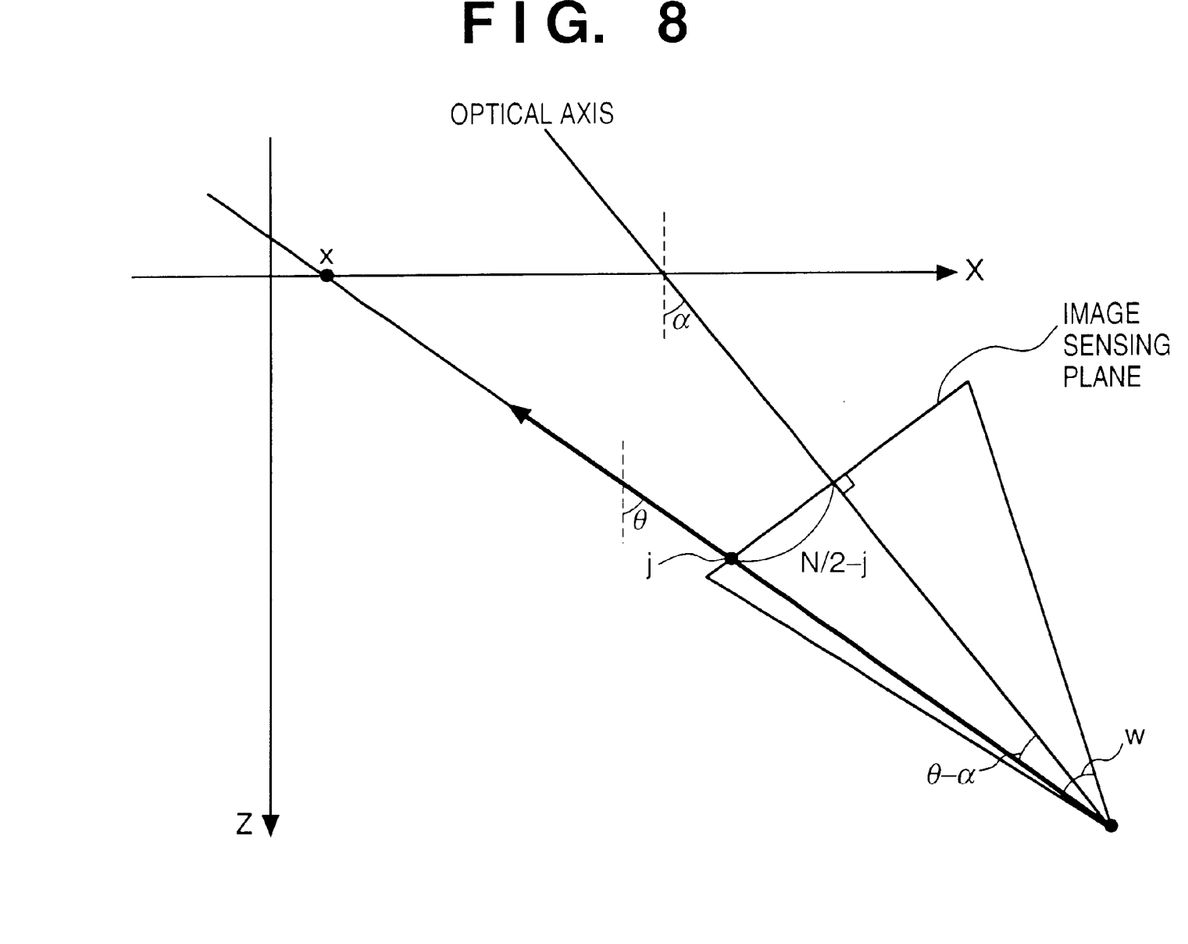
FIG. 8 is a view for explaining quantization in an embodiment of the present invention.

FIG. 8 is a view for explaining quantization of ray space data in this embodiment. More specifically, assume that ray space data to be processed by the image processing apparatus of this embodiment is image data obtained using a camera which has a CCD having N pixels in the main scanning direction, a field angle w, and an intersection angle $\alpha$ between the optical axis and Z-axis. If the pixels of the CCD are respectively ordered $0, \ldots, N-1$, in sequence, and $\theta$ represents the angle a light ray which passes through the j-th pixel makes with the Z-axis, and x represents the position where a light ray which passes through the j-th pixel intersects with the X-axis, we have:

$$\frac{N}{2}\tan(\theta - \alpha) = \left(\frac{N}{2} - j\right)\tan\left(\frac{W}{2}\right) \tag{3}$$

Note that mapping in FIG. 8 is done with respect to the Y-axis. If equation (3) holds for the j-th pixel on Y=m-th line (m=an arbitrary number), the angle $\theta$ corresponding to pixel j can be computed from equation (3). That is, if I" (i) represents the i-th image data, and that image data is converted into image data I' in an (x, $\theta$) space, which is further converted into image data I in an (x, u) space by u=tan$\theta$, this process is expressed by:

$$I''(i)=I'(x, \theta)=I(x, u) \tag{4}$$

u and x are appropriately quantized. For example, as for the x-axis, the spacing between two neighboring light rays on the x-axis is obtained, and quantization is done using this spacing as a quantization step. Also, as for the u-axis, quantization is done using the tangent of the angle make between two neighboring pixels with the camera view point position.

In this manner, ray space data exploits the fact that light rays focused to a given point in the real space are on a line in the ray space. That is, a line determined by a view point position, and the coordinates of the two ends of the boundary of this line are obtained. The coordinates of the two ends are equally divided between these two ends at the resolution of original ray space data, i.e., the resolution of that ray space data. The equally divided points are used as sampling points.

The principle of this embodiment will be explained below.

Figure 10:
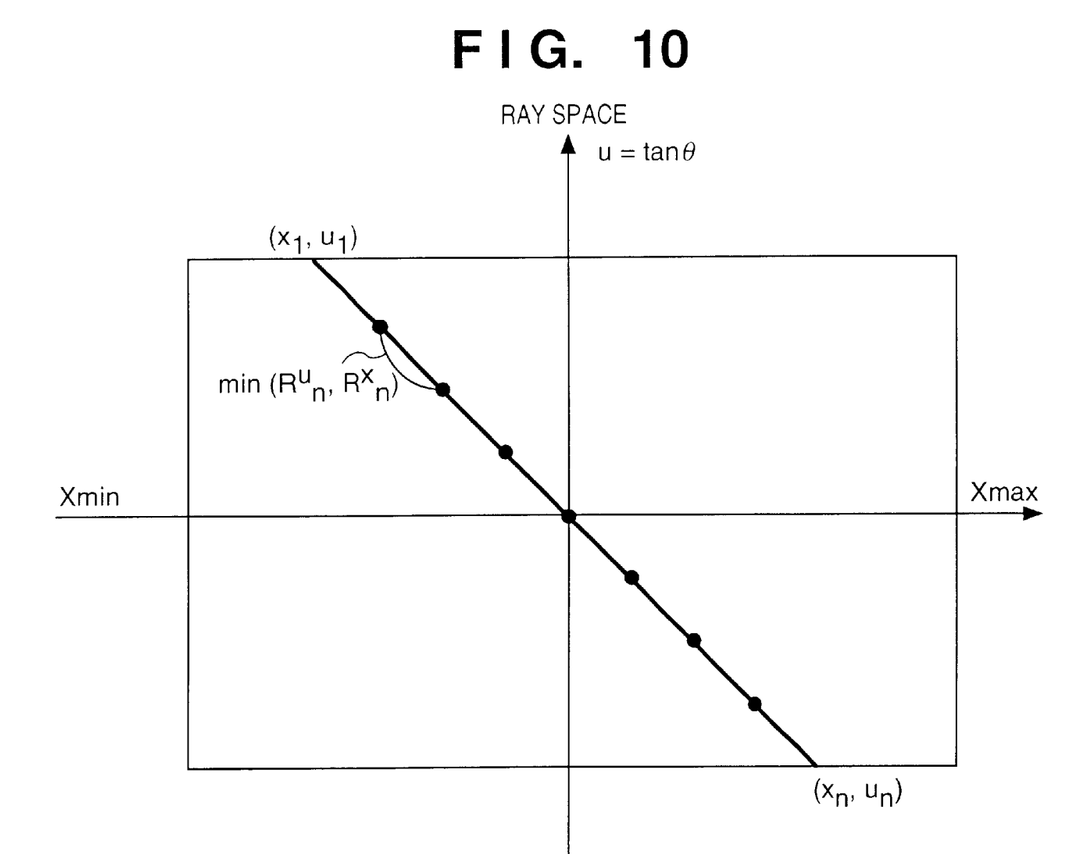
FIG. 10 is a view for explaining a scheme for obtaining an intersection with the boundary of a line that expresses a light ray group from a given view point position, and a scheme for sampling a portion between two ends at the resolution of ray space data in the embodiment of the present invention.

When the coordinates of the two ends of a line determined by the view point position are $(x_l, u_l)$ and $(x_n, u_n)$, the resolutions, $R^x_n$ and $R^u_n$, of the line in the x- and u-axis directions are defined by:

$$R^x_n = |x_n - x_l|/Q_x$$

$$R^u_n = |u_n - u_l|/Q_u$$

where $Q_x$ and $Q_u$ are the quantization steps of the original ray space. The resolution $R_m$ of the image to be generated is that in the horizontal direction. When $$R_m > R^u_n$$

or $$R_m > R^x_n \quad (5)$$

i.e., when the resolution of the image to be generated is higher than that of an original image (an image to be referred to), in other words, when the image is to be enlarged with respect to the original image, a plurality of pixels must refer to identical ray space data in the ray space. This is because space information and pixel information of ray space data are present in units of pixels, as described above. Upon reconstructing an image, when pixels on a line corresponding to the view point are sampled at equal intervals at a resolution $\min(R^u_n, R^x_n)$ of original ray space data, i.e., when ray space data is referred to at the lower of the resolutions, $R^u_n$ and $R^x_n$, of the u- and x-axes, since that ray space data is referred to at the original resolution, identical ray space data can be prevented from being referred to unlike the prior art. FIG. 10 shows an example of the sampling result at equal intervals from two ends $(x_l, u_l)$ and $(x_n, u_n)$ of a line segment at the resolution $\min(R^u_n, R^x_n)$.

Figure 11:
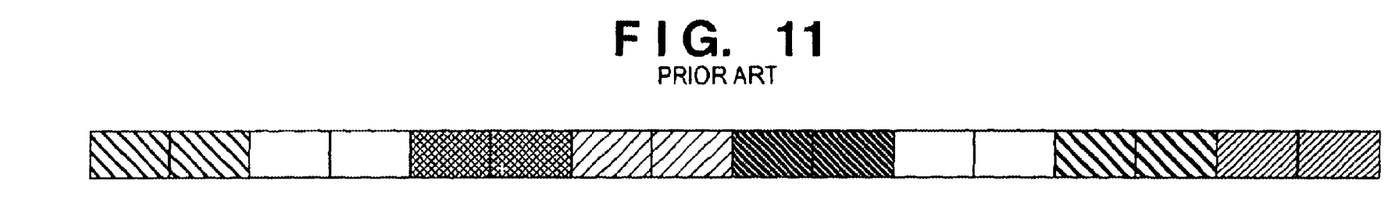
FIG. 11 is a view for explaining the reason for sampling identical pixels in the prior art.
Figure 12:
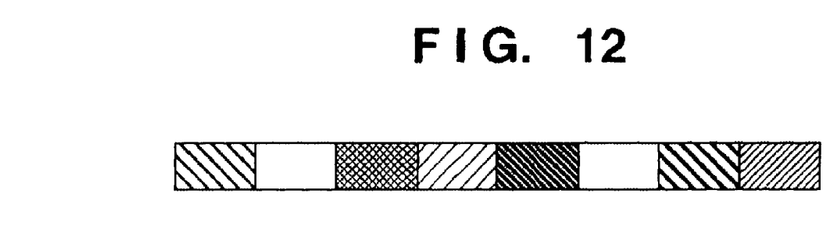
FIG. 12 shows a pixel distribution sampled by the scheme shown in FIG. 10.
Figure 13:
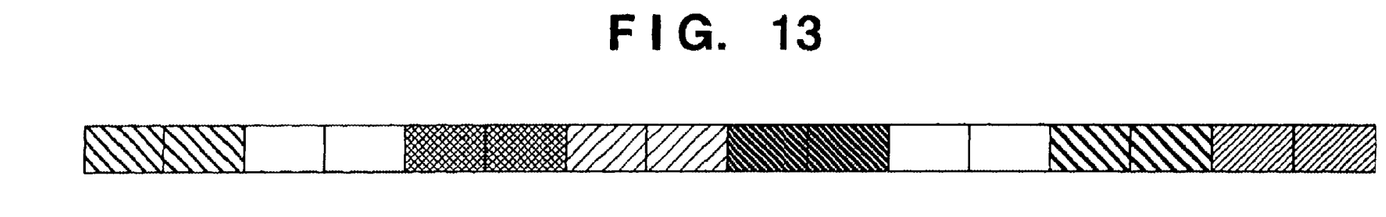
FIG. 13 is a view for explaining the principle of texture mapping for further increasing resolution.
Figure 14:
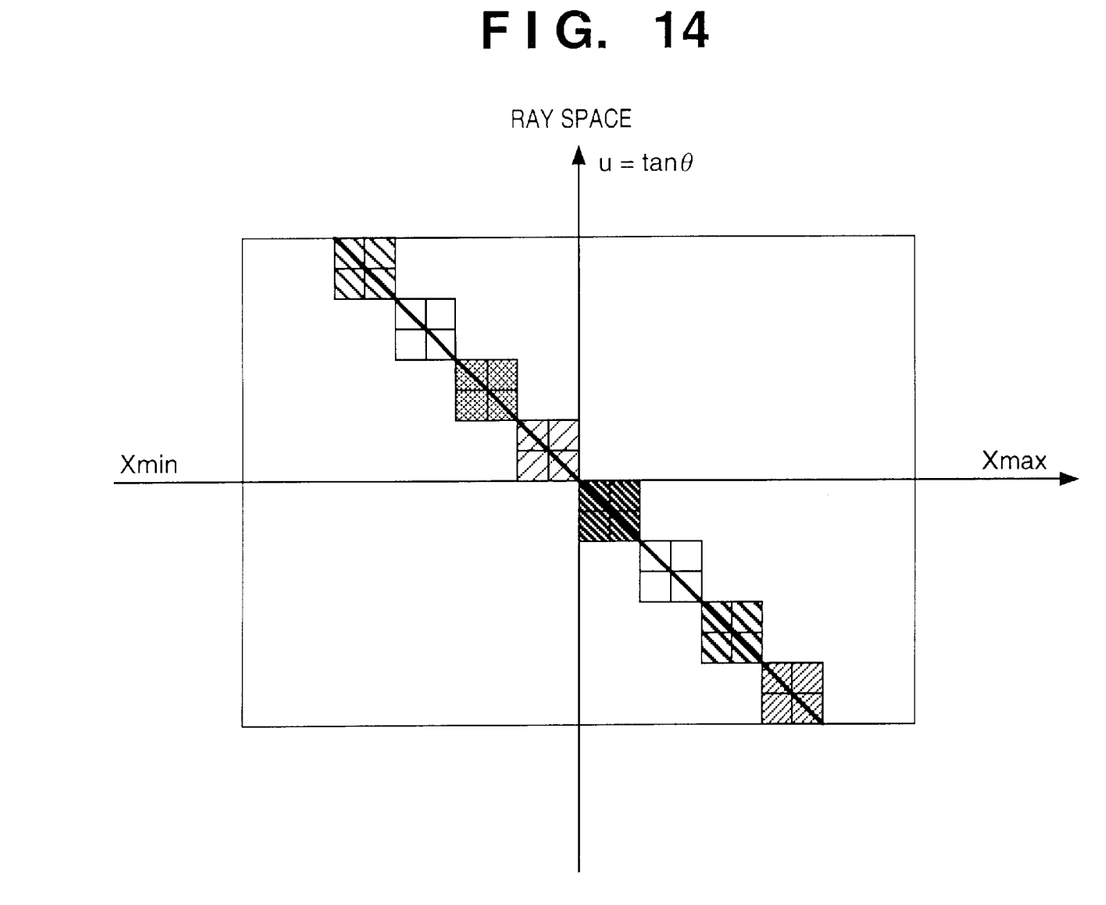
FIG. 14 is a view for explaining the principle of pixel interpolation implemented by texture mapping.

However, when the original ray space data are referred to at the original resolution, as described above, to prevent identical ray space data from being referred to upon enlarging an image, an image with the decreased resolution (FIG. 12) is reduced compared to a required image (FIG. 11). Hence, in this embodiment, empty pixel positions of the reduced image are interpolated by texture mapping (FIG. 13). FIG. 14 shows the principle of this interpolation. That is, when $$R^u_n > R^x_n \quad (6)$$

ray space data are multiplied by:

$$R_m / \min(R^u_n, R^x_n) = R_m / R^x_n \quad (7)$$

when $$R^u_n < R^x_n \quad (8)$$

ray space data are multiplied by:

$$R_m / \min(R^u_n, R^x_n) = R_m / R^u_n \quad (9)$$

to prevent identical ray space data from being referred to.

Furthermore, this embodiment is devised to attain faster sampling. That is, as shown in FIG. 10, by setting equally divided points of a line determined by the view point position to be sampling points, the u- and x-coordinates of the sampling points in the ray space can be computed at high speed by additions only. More specifically, when the resolution of the image to be generated in the horizontal direction is R, and the coordinates of the two ends of the line are $(x_l, u_l)$ and $(x_n, u_n)$, the coordinates of the next sampling point can be computed by adding only $\Delta x$ and $\Delta u$ $$\Delta x = \frac{x_n - x_1}{R} \quad (10)$$

$$\Delta u = \frac{u_n - u_1}{R} \quad (11)$$

The equally divided points can also be computed by multiplication and division, but only additions are used to achieve high-speed coordinate computations and faster sampling.

In the example shown in FIG. 14, ray space data are doubled in the x- and u-directions to have eight sampling points on the line as centers to interpolate empty ray space data.

Figure 9:
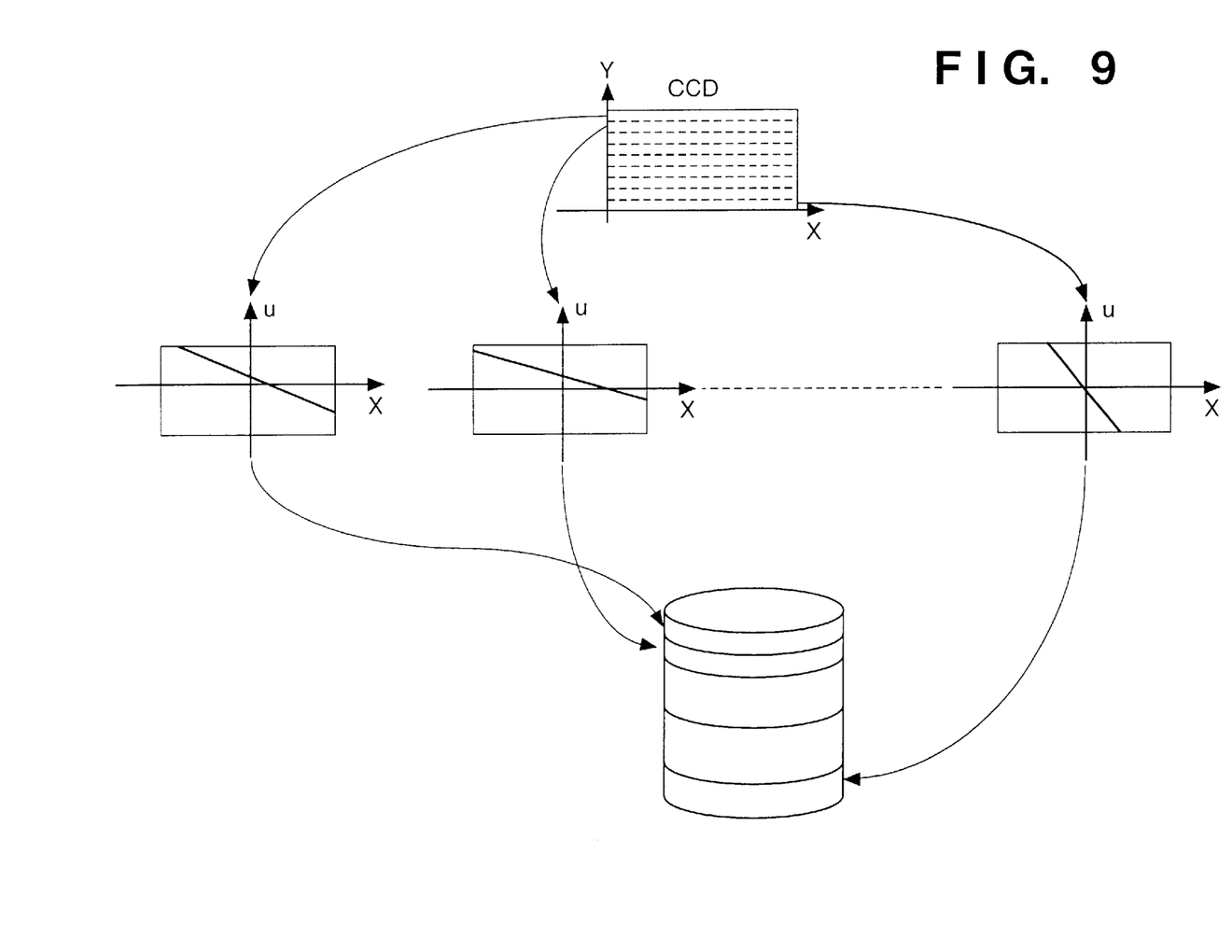
FIG. 9 is a view for explaining storage of ray space data in the embodiment of the present invention.
Figure 15:
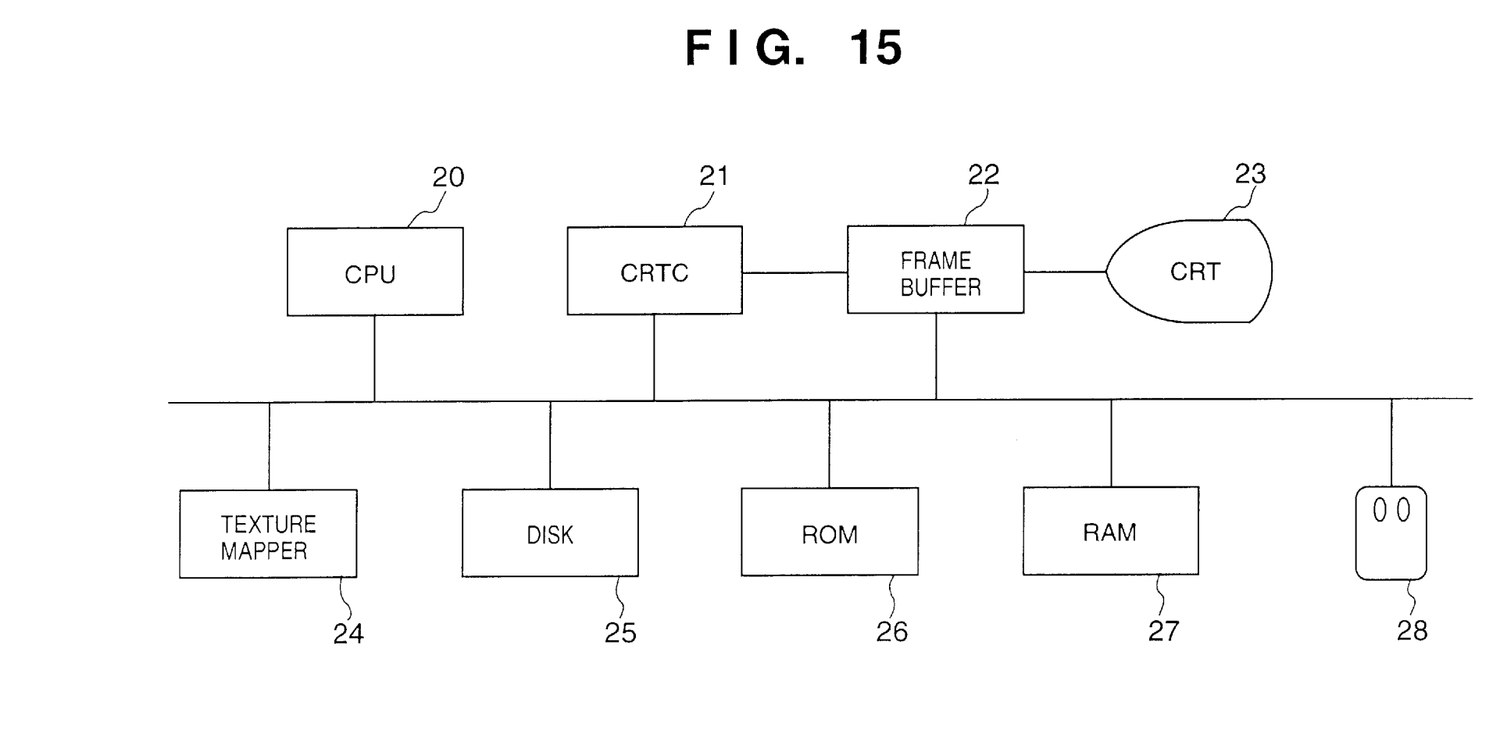
FIG. 15 is a block diagram showing the hardware arrangement of the embodiment of the present invention.

FIG. 15 shows the hardware arrangement of this embodiment. The hardware arrangement shown in FIG. 15 is that of a normal workstation. Referring to FIG. 15, especially, a disk 25 stores a large volume of ray space data, as shown in FIG. 9. This system presents a virtual space to the user on a CRT 23. At this time, the user can freely walk through that virtual space or can manipulate (move, rotate, or the like) an object in the virtual space by operating a mouse 28. Especially, an enlargement factor or the like may be input by the mouse 28 or a keyboard (not shown). When the enlargement factor is set, a CPU 20 makes the aforementioned computations, and also makes computations using a texture mapper 24, thus rendering an image on a buffer 22 via a CRTC 21.

Figure 16:
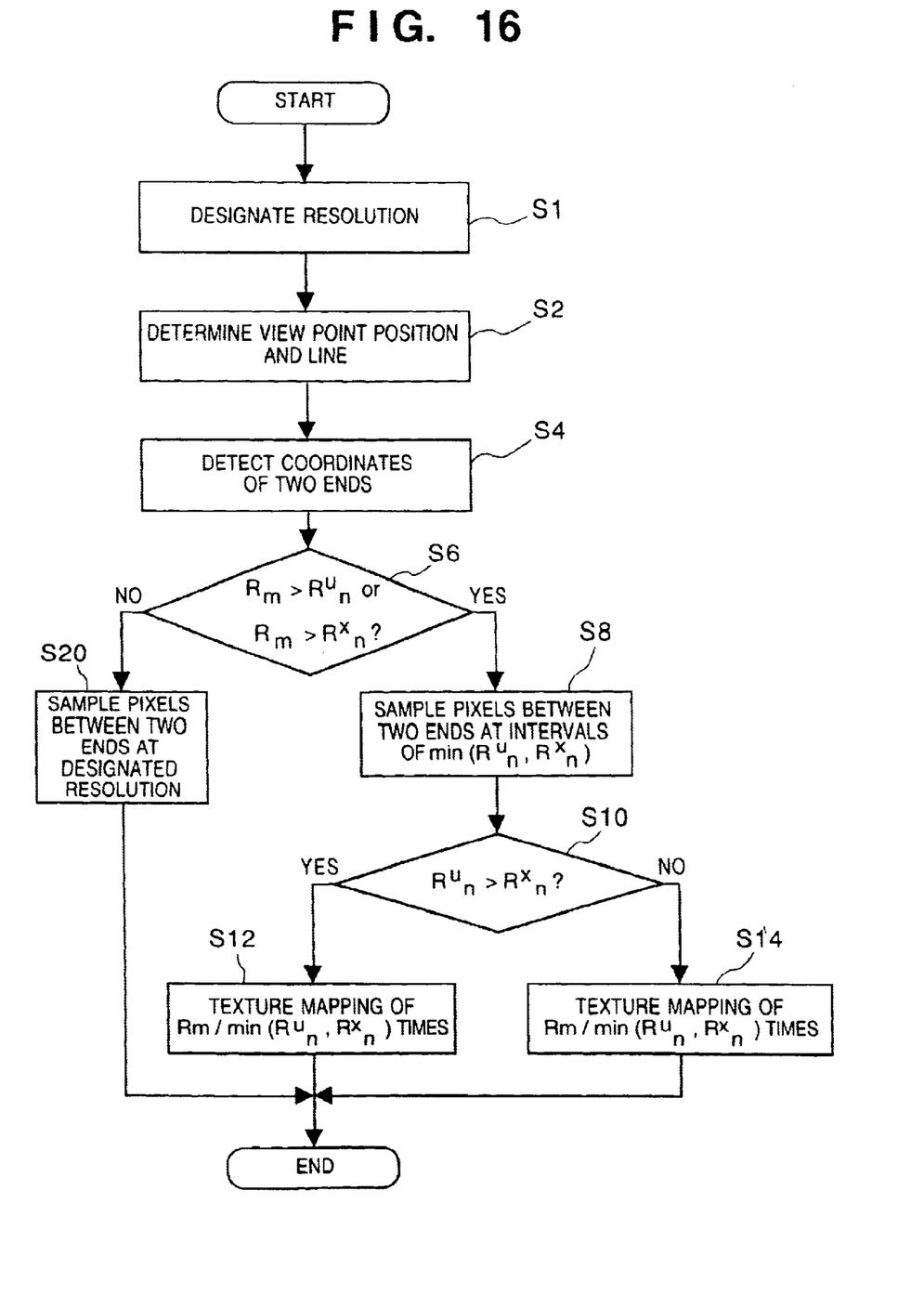
FIG. 16 is a flow chart showing the control sequence in the embodiment of the present invention.

FIG. 16 shows the control sequence of the system shown in FIG. 15.

In step S1, the resolution is designated by the user or an application program. This resolution depends on the magnification factor of, e.g., image enlargement designated by the user or application program, as described above. In step S2, the view point position (posture) of the user (viewer) is determined, and a line in the ray space is determined on the basis of the view point position/posture, as shown in, e.g., FIG. 6. In step S4, the coordinates of the two ends of that line (line segment) are detected.

It is checked in step S6 if the resolution of the image to be generated is higher than that of an original image, i.e., if inequality (5) is satisfied, in other words, if $R_m > R^u_n$ or $R_m > R^x_n$. If NO in step S6, since an image is not enlarged, i.e., no wasteful operation for sampling identical ray space data a plurality of times takes place, ray space data is sampled in step S20 at the resolution designated in step S1.

On the other hand, if YES in step S6, pixels on the line corresponding to the view point are sampled at equal intervals at the resolution $\min(R^u_n, R^x_n)$ of original ray space data. In this sampling, since ray space data are referred to at the original resolution, identical ray space data can be prevented from being referred to unlike the prior art. In step S10 and subsequent steps, texture mapping is done for pixel positions which are not sampled in step S8. That is, if $R^u_n > R^x_n$ (inequality (6)), mapping of $R_m/R^x_n$ (equation (7)) times is done in step S12; if $R^u_n < R^x_n$ (inequality (8)), mapping of $R_m/R^u_n$ (equation (7)) times is done in step S14.

Note that equations (10) and (11) are used in divisions at equal intervals in step S8 or S20.

When the resolution is externally set (e.g., when the texture size is limited upon using texture mapping hardware (24 in FIG. 15), a smaller of the resolutions obtained previously and the texture resolution can be used as a new resolution.

Various modifications of the present invention may be made.

In the above embodiment, ray space data are obtained by computations, but may be pre-stored as a table in a RAM or ROM.

The display device is not limited to the CRT. The present invention can also be applied to a lenticular or HMD display device.

To restate, according to the present invention, when an image is enlarged or the field angle is decreased, image enlargement can be done at high speed without referring to extra pixels.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:

recording means which has recorded in units of pixels image information appended with space information that has been quantized at a predetermined first resolution;

determination means for determining viewpoint information;

setting means for setting a second resolution higher than the first resolution; and sample/interpolation means for sampling image information of the first resolution from the recorded image information based on the view point information, interpolating the sampled image information using texture mapping based on the first and second resolutions, and outputting image information having the second resolution.

2. The apparatus according to claim 1, wherein the image information is expressed by a ray space theory.

3. The apparatus according to claim 2, wherein when ray space data has different resolutions in different coordinate axis directions, recorded ray space data are sampled at the lower resolution.

4. The apparatus according to claim 1, wherein the sample/interpolation means pastes texture data by enlarging texture data to a magnification of the second resolution/first resolution.

5. The apparatus according to claim 1, wherein the sample/interpolation means samples ray space data along a line segment which passes through a desired view point position in a ray space.

6. The apparatus according to claim 5, wherein the line segment is equally divided to a designated resolution, and the equally divided points are used as sampling points.

7. An image processing method for reconstructing an image based on image information read out from recording method which has recorded in units of pixels image information appended with space information that has been quantized at a predetermined first resolution, comprising:

determination step of determining viewpoint information;

setting step of setting a second resolution higher than the first resolution; and sample/interpolation step of sampling image information at the first resolution from the recorded image information based on the view point information, interpolating the sampled image information using texture mapping based on the first and second resolutions, and outputting image information having the second resolution.

8. The method according to claim 7, wherein the image information is expressed by a ray space theory.

9. The method according to claim 8, wherein when ray space data has different resolutions in different coordinate axis directions, recorded ray space data are sampled at the lower resolution.

10. The method according to claim 7, wherein the sample/interpolating step includes the step of pasting texture data by enlarging a texture data to a magnification of a second resolution/first resolution.

11. The method according to claim 7, wherein the sample/interpolation step includes a step of sampling ray space data along a line segment which passes through a desired view point position in a ray space.

12. The method according to claim 11, wherein the line segment is equally divided at a designated resolution, and equally divided points are used as sampling points.

13. A storage medium which stores a computer program for implementing a method of claim 7.

* * * * *